United States Patent
Kensicher et al.

(12) 
(10) Patent No.: US 6,660,799 B1
(45) Date of Patent: Dec. 9, 2003

(54) ACRYLIC COPOLYMER AGENTS BASED ON URETHANE FOR IMPROVING THE WORKABILITY OF HYDRAULIC BINDERS, PREPARATION METHOD, BINDERS CONTAINING SAME AND USES THEREOF

(75) Inventors: Yves Kensicher, Lozanne (FR); Jean-Marc Suau, Lucenay (FR)

(73) Assignee: Coatex S.A., Genay (FR)

( * ) Notice: Subject to any disclaimer, the term of this patent is extended or adjusted under 35 U.S.C. 154(b) by 0 days.

(21) Appl. No.: 09/959,568

(22) PCT Filed: Apr. 25, 2000

(86) PCT No.: PCT/FR00/01081

§ 371 (c)(1),
(2), (4) Date: Jan. 29, 2002

(87) PCT Pub. No.: WO00/66511

PCT Pub. Date: Nov. 9, 2000

(30) Foreign Application Priority Data

Apr. 30, 1999 (FR) .............................. 99 05665

(51) Int. Cl.$^7$ .......................... C08F 16/28; C08F 16/04
(52) U.S. Cl. .................. 524/555; 524/556; 524/558; 524/560; 524/589; 524/5; 106/638; 106/727; 106/719; 106/703; 106/706
(58) Field of Search ................. 524/507, 555, 524/558, 511, 525, 5, 556, 560, 589; 106/638, 727, 719, 703, 706

(56) References Cited

U.S. PATENT DOCUMENTS

| | | | |
|---|---|---|---|
| 5,725,654 A | | 3/1998 | Shawl et al. |
| 6,057,398 A | * | 5/2000 | Blum .......................... 524/507 |
| 6,187,841 B1 | * | 2/2001 | Tanaka et al. .................. 524/5 |

FOREIGN PATENT DOCUMENTS

| | | |
|---|---|---|
| EP | 0 725 043 | 8/1996 |
| EP | 0 753 488 | 1/1997 |
| EP | 0 870 784 | 10/1998 |

OTHER PUBLICATIONS

J. A. Brydson, Plastics Materials, Butterworth Scientific, 4$^{th}$ Ed. p. 698.*

* cited by examiner

Primary Examiner—David W. Wu
Assistant Examiner—Satya B Sastri
(74) Attorney, Agent, or Firm—Oblon, Spivak, McClelland, Maier & Neustadt, P.C.

(57) ABSTRACT

The invention relates to the technical field of mortars, concretes, and other compositions based on cement, and in particular to agents capable of modifying their rheological characteristics, in particular workability. Workability may be defined as the property of a hydraulic binder to remain workable during as long a time as possible. The invention relates to novel agents of the acrylic copolymer type having urethane functions for improving the workability of hydraulic binders, to a method of preparing such novel agents, to binders containing them, and to uses for them. Such agents have the advantageous property of not retarding the setting time.

33 Claims, 1 Drawing Sheet

(a)

(b)

Figure 1:
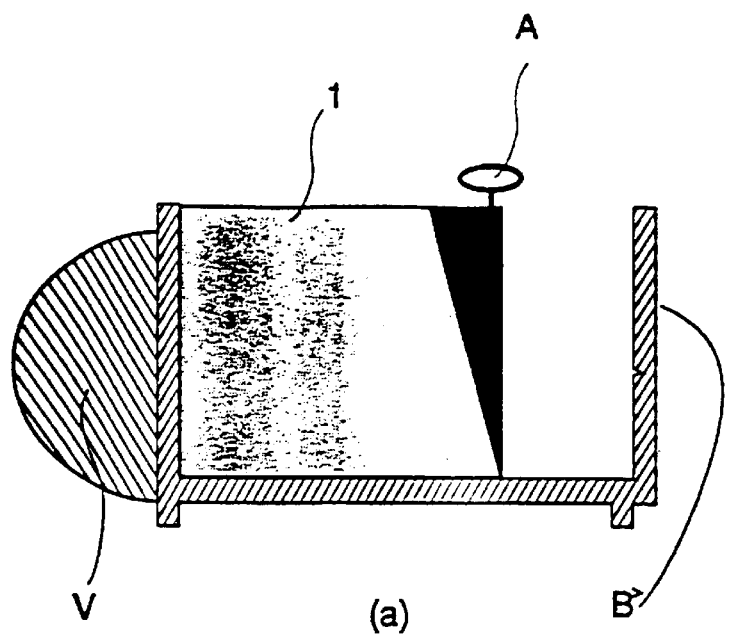
Figure 1:
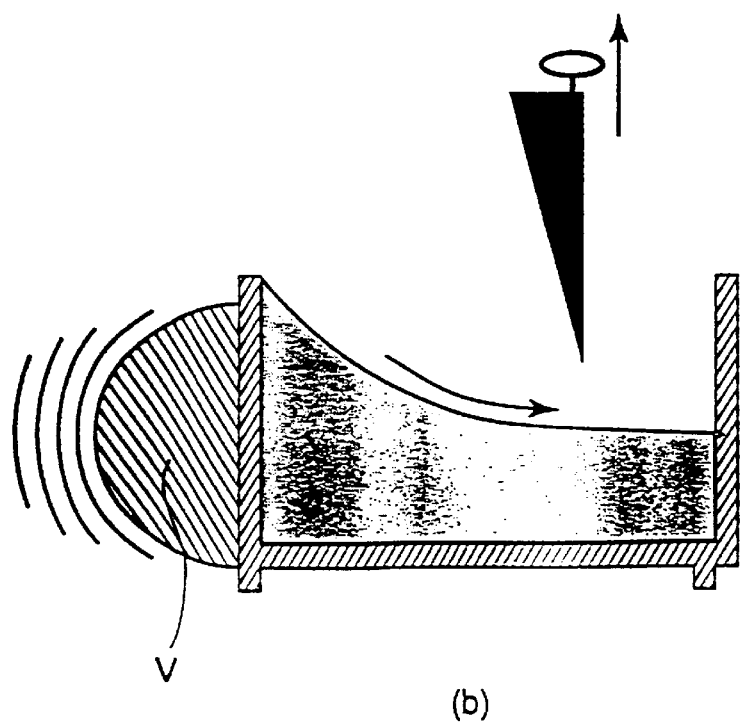

ACRYLIC COPOLYMER AGENTS BASED ON URETHANE FOR IMPROVING THE WORKABILITY OF HYDRAULIC BINDERS, PREPARATION METHOD, BINDERS CONTAINING SAME AND USES THEREOF

The present invention relates to the technical field of mortars, concretes, and other compositions based on cement and/or plaster, i.e. generally hydraulic binders and compounds, and in particular to agents capable of modifying their rheological characteristics, in particular workability.

Workability can be defined as being the property of a mortar or cement slip or slag, or more generally of a hydraulic binder of remaining workable during as long a time as possible, i.e. of being capable of being displaced from one container to another, of being stored, of being pumped with ease or with relative ease, and of being transported to a site on which it is to be used, and of having analogous characteristics, and therefore of being usable for a prolonged period. That property can be evaluated by means of the fluidity time of the hydraulic binder. The essential influence of such agents lies in the fact that the viscosity of the slag or slip remains stable for a prolonged period. The viscosity is stable for a long period, but is not necessarily lower than with other substances.

Such agents should be distinguished from retarding agents whose function is to retard the setting of the hydraulic binder.

For a long time now, the person skilled in the art has being studying additives designed to be used as cement thinners without having any significant effect on the setting delay.

Thus, Patent EP 0 303 747 describes copolymers of (meth)acrylic acid (20% molar to 40% molar) and of hydroxyalkylated (meth)acrylic esters (80% molar to 60% molar) of high molecular weight (minimum of 70,000 g.mole).

Patent EP 0 556 061 describes copolymers of maleic anhydride and of surfactant monomers that are allylated, oxyalkylated, and functionalized by groups of short alkyls (1 to 4 carbons).

It is indicated that a mixture of such copolymers is capable of replacing advantageously the formulations described in Patent EP 0 490 681.

That patent describes an additive designed to improve the workability of cements and mortars and to improve workability time. That additive is constituted by a mixture of three components:

a lignosulfonate salt;
a copolymer of maleic anhydride and of an alkyl oxyalkylene allyl (for respective molar ratios varying in the range 1 to 3, and claimed molecular weights lying in the range 1,000 to 200,000); and
an anionic surfactant.

The person skilled in the art is acquainted with Patent WO 94/05606 which relates to a specific dispersing agent making it possible to reduce the quantity of bubbles in cements. That dispersion agent is a dispersant, water-soluble polymer which can be a polyacrylate grafted with a methoxy-polyethyleneglycol (methoxy-PEG), a copolymer of maleic anhydride functionalized with a methoxy-PEG, or a copolymer of maleic anhydride and of methoxy-PEG allyl.

That document also describes a viscosity-reducing agent function which can be an alkaline agent, an alkaline-earth agent, an amine of low molecular weight, or a urea or thiocyanate salt.

The person skilled in the art is also acquainted with Patent WO 95/09821 which describes a hydraulic cement additive designed to improve rheology, and defined as being derived from acrylic polymers. Such polymers are exclusively imidized acrylates obtained by thermal condensation of primary amines with polyacrylic acids (180° C.—2 hours of reaction) or by catalyzed reaction with dicyclohexylcarbodiimide (70° C.—4 hours of reaction). The substitution ratios claimed vary over the range 10% to 50%.

Similarly, Patent WO 95/16643 describes a thinning additive designed for hydraulic cements. That additive is chosen from terpolymers of alkyl-PEG (meth)acrylate, of (meth)acrylic acid, and of a sulfonated (meth)allyl monomer. Those polymers are obtained by radical polymerization and in aqueous medium.

Patent EP 0 725 043 is extremely general, claiming a large number of molecules obtained by implementing widely differing chemical methods, and no practical teaching can be discerned from that patent.

It would seem that document describes a dispersing agent for cement and mortar that limits shrinkage on drying, thus preventing cracks from appearing. The macromolecule is defined as being a polycarboxylic acid (and its salts) grafted or modified with oligoalkylene glycols and polyalkylene glycols.

The extremely general definition of the polyacids includes the following copolymers: styrene-maleic, allylether-maleic, diisobutylene-maleic, acrylic, and methacrylic.

The oligomers are ethers of low molecular weight that are widely used in paints as coalescence solvents.

The styrene-maleic anhydride and allyl-maleic copolymers are synthesized in the solvent and then the resulting polyanhydride is grafted by means of alcohols.

In the case of acrylics, oxyalkylated monomers are formed with acryloyl chloride, and they are then copolymerized in isopropanol in the presence of (meth)acrylic acid.

Patent EP 0 753 488 is also a patent that claims chemical structures very broadly. Those structures are described as being dispersing agents that are extremely effective in reducing workability problems, even for cements having very low water contents.

The polymers described are all obtained by direct radical polymerization. They are terpolymers of methacrylic or acrylic acid (6% to 60%), of a methacrylate or acrylate of alkoxy ($C_1$ to $C_5$) PEG (polyethylene glycol) (40% to 94%), and of a third monomer (0% to 10%).

The synthesis of each of the molecules is given in detail, and they are compared with molecules that are identical but of different polydispersity.

The person skilled in the art can also make reference to Patent EP 0 271 435 which concerns the synthesis of an additive for a hydraulic binder or compound. The product is defined as being a grafted polymer and is obtained by radically polymerizing an acrylic monomer in a medium constituted only by surfactants (polyethylene glycol: PEG, polypropylene glycol: PPG). The mixture is then diluted with water and then neutralized. No information is given about the grafting yields, but the effectiveness of the products was workability tested.

The products currently on the market correspond to the chemistry of the agents described in Patents EP 0 612 702, EP 0 792 850, EP 0 816 298, U.S. Pat. No. 5,362,829, U.S. Pat. No. 5,633,298 or in U.S. Pat. No. 5,668,195. In the same chemistry of polyacrylic or grafted polyacrylate acids including oligoalkyleneglycol and/or polyalcohol chains and polyalkylene glycols, U.S. Pat. No. 5,660,626 describes dispersing agents for reducing the shrinkage of compositions of cements, mortars and concretes, which agents are active at low concentrations.

Unfortunately, all of those agents give workability characteristics that are not entirely satisfactory to the person skilled in the art.

Mention should also be made of French Patent Application No. 9808484 that is unpublished on the priority date of the present application, and that describes the use, with cements, of polycondensates obtained by causing polyethylene glycols and their derivatives to react with isocyanates and alcohols of low molecular weight so as to synthesize polymers that are soluble in water or partially soluble in water, which makes it possible to improve significantly the workability of mortars, concretes, and other compositions based on cement and/or on plaster, and defined as hydraulic binders or compounds. Such workability leads to an increase in the fluidity time of the resulting hydraulic compound, making it possible to use the compound for prolonged periods. The products described consist of polycondensates obtained by causing polyethylene glycols (PEGs) and their derivatives such as, for example, ethylene oxide and propylene oxide copolymers, to react with mono-, di-, or tri-isocyanates and optionally alcohols of low molecular weight.

The general state of the art shows that, outside the above-mentioned unpublished application, all of the new thinners designed to impart workability to cement are water-soluble acrylic or maleic and/or allyl polymers (unlike the prior art in which, as indicated above, lignosulfonates, sulfonated phenol-formol resins, and surfactants are used), and such polymers are weakly anionic and strongly functionalized by esters of alkoxy (short alkoxys having 1 to 4 carbons) polyethylene glycols groups. In the remainder of the description below, the letters PEG are used as an abbreviation for polyethylene glycol.

The closest prior art, outside the above-mentioned unpublished application would seem to be the Sandoz Patent EP 0 725 043, but that document describes only grafted polyacids, oligoalkyleneglycols and polyalkyleneglycols, in a ratio of 50/50 in % by weight.

In addition, a major drawback of the prior art, other than the above-mentioned unpublished application, lies in the presence of a carboxylic chain, because such a chain imparts a major retardant property. Unfortunately, although the industry wishes to increase the workability, i.e. the duration of use of a binder, it absolutely does not want setting to be retarded at the chosen moment of use.

The Applicant's above-mentioned unpublished application has made significant progress by proposing a workability agent that does not retard or that hardly retards the setting time of the hydraulic binder.

However, there remains a major need in the industry in question for a workability agent for mortars, concretes, and other hydraulic binders, which workability agent offers further-increased workability properties. In the above review of the prior art, it appears that the properties involved are extremely sensitive and often antagonistic, which makes progress difficult.

In the invention, it has been discovered that radical co-polymerization of at least one ethylene monomer, having an alkoxy-polyalkylene glycol urethane function and more particularly alkoxy-PEG urethane, with at least one anionic monomer and at least one non-ionic monomer, optionally in the presence of alkoxy-PEG (meth)acrylate and of crosslinking agents, surprisingly imparts a significant improvement in workability, whereas the prior art makes no mention of the presence of monomers having alkoxy-polyalkylene glycol urethane functions, and more particularly of alkoxy-PEG urethane.

It has thus been discovered that the use, with mortars, concretes and other hydraulic binders, of acrylic copolymers containing at least one alkoxy-polyalkylene glycol urethane function, resulting in the synthesis of water-soluble polymers, makes it possible to increase significantly the workability of mortars, concretes, and other compositions based on cement and/or on plaster, such compositions based on cement and/or plaster being more generally defined as hydraulic compounds or binders. This workability results in an increase in the fluidity time of the resulting hydraulic compound, thereby making it possible for said compound to be used for a prolonged period.

The invention provides workability agents for mortars, concretes, and other hydraulic binders, said workability agents being characterized in that they consist of copolymers obtained by radical copolymerization of at least one alkoxy-polyalkylene glycol urethane ethylene monomer and more particularly alkoxy-PEG urethane with at least one anionic monomer and at least one non-ionic monomer optionally in the presence of alkoxy-PEG acrylate or methacrylate, said PEG (polyethylene glycol) being defined by a molecular weight greater than 300, and optionally in the presence of one or more ethylene monomers having at least two polymerizable double bonds, and also referred to as "crosslinking agents".

The invention also provides hydraulic binders such as concretes, mortars, and mixtures based on cement and/or on plaster, each of them containing a workability agent of the invention.

The invention also provides the use of hydraulic binders containing the novel workability agent in construction, building, public works or in petroleum cements and petroleum service and supply industries.

The co-polymer constituting the novel workability agent of the invention for mortars, concretes and other hydraulic binders is prepared using known methods of performing radical copolymerization in solution, in emulsion, or in suspension on the mixture of the above-mentioned monomers, in the presence of a catalytic system and transfer agents that are known, implemented in appropriate quantities, the molecular weight of said copolymer being adjusted by known means such as, for example, temperature, catalyst content, presence or absence of transfer agents, or by any other means or combination of means known to the person skilled in the art.

The catalytic polymerization system, which can vary in quantity by weight in the range 0.1% to 10% relative to the total mass of the monomers, is desirably chosen from those which are water-soluble such as, for example, ammonium, potassium, or sodium persulfates, or peroxides or hydroperoxides such as, in particular, hydrogen peroxide, and optionally implemented with a known reducing compound such as, in particular sodium metabisulfite or metallic salts.

The chain transfer agent, whose quantity by weight may vary in the range 0% to 5% by weight relative to the total mass of the monomers used is desirably chosen from alkyl-mercaptans such as, for example, octanethiol, decanethiol, n-dodecanethiol, t-dodecanethiol, or from mercaptopropionic acid, mercaptosuccinic acid, thioglycolic acid, or mercaptoethanol or else secondary alcohols, certain alkyl halides or salts of acids of phosphorus of oxidation number less than 5, as well as various other additives known to the person skilled in the art, as chain limiters.

In the entire present application, the designations of the following abbreviations used are as follows:

PO$_4$EGMA=ethylene glycol methacrylate phosphate

EGMA=ethylene glycol methacrylate

PEG 350=polyethylene glycol of molecular weight 350
PEG 750=polyethylene glycol of molecular weight 750
and by analogy, any number after the letters PEG indicates the molecular weight of said PEG
EA=ethyl acrylate
Acryl=acrylamide
MAA=methacrylic acid
AA=acrylic acid
TEA=triethanolamine
TDI=toluene diisocyanate
IPDI=isophorone diisocyanate In the present invention, the following monomers are polymerized:

a) at least one anionic monomer;

b) at least one non-ionic monomer;

c) at least one alkoxy-polyalkylene glycol urethane ethylene monomer, sometimes referred to as a "special urethane monomer";

d) optionally an alkoxy-PEG (meth)acrylate; and e) optionally one or more ethylene monomers having at least two polymerizable double bonds and referred to as "crosslinking agents";

the sum of the quantities of the monomers a), b), c), d) and e) being equal to 100%.

The anionic monomer(s) is/are chosen from acrylic acid, methacrylic acid, acrylamido-methyl-propane-sulfonic acid, alkylene glycol acrylate or methacrylate sulfonate or sulfate or phosphonate, or phosphate, itaconic acid, maleic anhydride, sodium methallylsulfonate, sulfonic styrene acid, and more particularly chosen from acrylic acid, methacrylic acid, acrylamido-methyl-propane-sulfonic acid, ethylene glycol methacrylate phosphate, or ethylene glycol acrylate phosphate.

The non-ionic monomer(s) is/are chosen from acrylamide or methacrylamide or their derivatives, $C_1$ to $C_5$ alkyl-esters of acrylic or methacrylic acids, oxyalkylated alkoxy acrylates or methacrylates (the number of alkylene oxides lying in the range 1 to 5), vinyl acetate, vinylpyrrolidone, styrene, or alphamethyl-styrene, and more particularly chosen from ethyl acrylate or acrylamide.

The alkoxy-polyalkylene glycol urethane monomer(s) is/are chosen from the reaction products of methoxy-polyalkylene. glycol reacting with a polymerizable unsaturated isocyanate, and more particularly from the reaction products of methoxy-PEG reacting with an acrylic isocyanate or a methacrylic isocyanate or a vinyl or allyl isocyanate.

The novel agents of the invention are thus products that can be termed partially PUR (polyurethane). The compounds in unpublished French Patent Application No. 9808484 are said to be "100% PUR (polyurethane)", are non-ionic, and are obtained by polycondensation, whereas those of the present invention are obtained by radical polymerization and are partially anionic.

In the present invention, at least 3% of special urethane monomer is used.

In the invention, the monomers are used in the following proportions in the copolymer:

for the monomer a), in the range 1% to 50% by weight, and preferably in the range 5% to 40% by weight;

for the monomer b), in the range 2% to 65% by weight, and preferably in the range 5% to 60% by weight;

for the monomer c), in the range 3% to 65% by weight, and preferably in the range 10% to 50% by weight;

for the monomer d), in range 0% to 90% by weight, and preferably in the range 0% to 70% by weight; and for the monomer e), in the range 0% to 5% by weight, and preferably in the range 0% to 3% by weight;

the sum of the quantities of the monomers a), b), C), d) and e) being equal to 100%.

The present invention thus uses the replacement of an ester function serving to key onto the alkoxy-PEG group with a urethane bridge which improves significantly the workability properties, within the above limits of the urethane functions in the copolymers of the invention.

The copolymers of the invention may or may not be crosslinked.

If they are crosslinked, it is possible to use up to about 5% by weight, relative to the total mass of the monomers, of crosslinking agents well known to the person skilled in the art such as methylene-bis-acrylamide or MBA, methylene-bis-methacrylamide, allyl acrylate, tetrallyloxyethane, triallylcyanurates or TACs, allyl ethers obtained from polyols such as in particular sorbitol, sucrose or the like such as triallylated pentaerythritol, pentaerythritol triacrylates, ethylene glycol dimethacrylate or EDMA, trimethylolpropane triacrylate, and di- or tri-vinylbenzenes, and analogous compounds.

The copolymers of the invention may be used in salt form or in partially neutralized form, in particular obtained by sodium ions, but equally possibly by ions of potassium, magnesium, calcium, lithium, ammonium, or triethanolamine and other amines. The invention thus also provides these agents and their uses.

For fabricating alkoxy-polyalkylene glycol urethane monomers that are reaction products of alkoxy-polyalkylene glycol reacting with a polymerizable unsaturated isocyanate, one of the following is preferably but non-limitingly used as the polymerizable unsaturated isocyanate: dimethyl isopropenyl benzyl isocyanate, methacryloyl isocyanate, or allyl-isocyanate, or the reaction product of a diisocyanate such as, for example, toluene diisocyanate (TDI) or isophorone diisocyanate (IPDI) reacting with a polymerizable unsaturated alcohol preferably chosen from ethylene glycol acrylate, ethylene glycol methacrylate, or allyl alcohol.

For fabricating the alkoxy-polyalkylene glycol urethane monomers, the following is preferably but non-limitingly used: an alkoxy-polyethylene glycol, the alkyl chain being chosen from chains having 1 to 5 carbon atoms, although the methyl group is preferable, the length of the oxyethylated chain being chosen in the range of molecular weights from 350 to 5,000, and more preferably in the range of molecular weights from 500 to 1,500.

The copolymers of the invention are of molecular weight corresponding to a specific viscosity of less than substantially 2, and preferably lying in the range 0.3 to 1.6, values of above substantially 2 corresponding to poor workability.

The specific viscosity of the copolymer is symbolized by the letter η and it is determined as follows:

A copolymer solution is taken so as to obtain a solution corresponding to 2.5 g of dry polymer neutralized with soda and to 50 ml of a bipermuted water solution.

Then, a capillary viscometer of Baume constant equal to 0.000105 placed in a bath whose temperature is thermostatically set at 25° C. is used to measure the flow time of a given volume of the above-mentioned solution containing the copolymer, and the flow time of the same volume of the bipermuted water solution without said copolymer. It is then possible to define the specific viscosity η by means of the following relationship:

$$\eta = \frac{\text{(flow time of the copolymer solution)} - \text{(flow time of the bipermuted water solution)}}{\text{flow time of the bipermuted water solution}}$$

The capillary tube is generally chosen such that the flow time of the bipermuted water solution not containing the copolymer is approximately in the range 90 seconds to 100 seconds, thus giving specific viscosity measurements of very high accuracy.

Other characteristics and advantages of the invention will appear more clearly on reading the following description with reference to the accompanying drawing, in which FIG. 1/1 diagrammatically shows a "workability meter" or "vibrator".

The following examples illustrate the invention without, however, limiting its scope.

EXAMPLE 1

This example relates to synthesizing various special urethane monomers.

Test No. 1:

300 g. of methoxy-PEG 350 containing less than 2,000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment:

| | |
|---|---|
| Toluene diisocyanate | 149.1 g |
| Alloocimene | 0.28 g |
| Dibutyl tin dilaurate | 1.61 g |
| Ethyl acetate | 258 g | and 111.8 g of ethylene glycol methacrylate was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 65° C. Once the pouring was finished, the resulting ensemble was allowed to react for one hour at 65° C.

Distillation under a vacuum was then performed in order to remove the residual solvent.

The resulting product was a pale yellow paste whose monomer content was 100%.

Test No. 2:

300 g of methoxy-PEG 500 containing less than 2000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 500 ml:

| | |
|---|---|
| Toluene diisocyanate | 104.4 g |
| Alloocimene | 0.2 g |
| Dibutyl tin dilaurate | 1.13 g |
| Ethyl acetate | 180 g | and 78g of ethylene glycol methacrylate was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 65° C. Once the pouring was finished, the resulting ensemble was allowed to react for one hour at 65° C.

Distillation under a vacuum was then performed in order to remove the residual solvent.

The resulting product was a pale yellow paste whose monomer content was 100%.

Test No. 3:

300 g of methoxy-PEG 750 containing less than 2000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 500 ml:

| | |
|---|---|
| Toluene diisocyanate | 69.4 g |
| Alloocimene | 0.13 g |
| Dibutyl tin dilaurate | 0.75 g |
| Ethyl acetate | 120 g | and 52.0 g of ethylene glycol methacrylate was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 65° C. Once the pouring was finished, the resulting ensemble was allowed to react for one hour at 65° C.

Distillation under a vacuum was then performed in order to remove the residual solvent.

The resulting product was a pale yellow paste whose monomer content was 100%.

Test No. 4:

300 g of methoxy-PEG 1100 containing less than 2,000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 250 ml:

| | |
|---|---|
| Toluene diisocyanate | 47.45 g |
| Alloocimene | 0.09 g |
| Dibutyl tin dilaurate | 0.51 g |
| Ethyl acetate | 81.60 g | and 35.36 g of ethylene glycol methacrylate was poured gradually over these components in 45 minutes.

The reaction was started at 250C., and then the temperature rapidly reached 45° C., whereupon it was stabilized. Baking was then performed for 45 minutes at this temperature, and then the resulting ensemble was poured in 20 minutes over the methoxy-PEG as pre-heated to 65° C. Once the pouring was finished, the resulting ensemble was allowed to react for one hour at 65° C.

Distillation under a vacuum was then performed in order to remove the residual solvent.

The resulting product was a pale yellow paste whose monomer content was 100%.

Test No. 5:

300 g of methoxy-PEG 1800 containing less than 2,000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 250 ml:

| Toluene diisocyanate | 29.00 g |
|---|---|
| Alloocimene | 0.06 g |
| Dibutyl tin dilaurate | 0.32 g |
| Ethyl acetate | 50.40 g | and 21.84 g of ethylene glycol methacrylate was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 65° C. Once the pouring was finished, the resulting ensemble was allowed to react for one hour at 65 C.

Distillation under a vacuum was then performed in order to remove the residual solvent.

The resulting product was a pale yellow paste, which was solid at ambient temperature, and whose monomer content was 100%.

Test No. 6:

600 g of methoxy-PEG 5000 containing less than 2,000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 250 ml:

| Toluene diisocyanate | 20.90 g |
|---|---|
| Alloocimene | 0.04 g |
| Dibutyl tin dilaurate | 0.23 g |
| Ethyl acetate | 36.00 g | and 15.6 g of ethylene glycol methacrylate was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 75° C. Once the pouring was finished, the resulting ensemble was allowed to react for one hour at 75° C.

Distillation under a vacuum was then performed in order to remove the residual solvent.

The resulting product was a pale yellow paste, which was solid at ambient temperature, and whose monomer content was 100%.

Test No. 7:

300 g of methoxy-PEG 750 containing less than 2,000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 500 ml:

| Toluene diisocyanate | 69.4 g |
|---|---|
| Alloocimene | 0.13 g |
| Dibutyl tin dilaurate | 0.75 g |
| Ethyl acetate | 120 g | and 23.2 g of allyl alcohol was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 65C. Once the pouring was finished, the resulting ensemble was allowed to react for one hour at 65° C.

Distillation under a vacuum was then performed in order to remove the residual solvent.

The resulting product was a pale yellow paste whose monomer content was 100%.

Test No. 8:

300 g of methoxy-PEG 750 containing less than 2,000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 500 ml:

| IPDI | 88.66 g |
|---|---|
| Alloocimene | 0.13 g |
| Dibutyl tin dilaurate | 0.75 g |
| Ethyl acetate | 120 g | and 52.0 g of ethylene glycol methacrylate was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 65° C. Once the pouring was finished, the resulting ensemble was allowed to react for one hour at 65° C.

Distillation under a vacuum was then performed in order to remove the residual solvent.

The resulting product was a pale yellow paste whose monomer content was 100%.

Test No. 9:

300 g :of methoxy-PEG 750 containing less than 2,000 ppm of water was loaded into a one-liter reactor equipped with a mechanical agitator, with a heating system, and with a temperature-measurement system, the entire reactor being isolated from the ambient humidity.

The following components were loaded into another reactor that was similar from the point of view of its equipment but that had a volume of 500 ml:

| | |
|---|---|
| Toluene diisocyanate | 69.4 g |
| Alloocimene | 0.13 g |
| Dibutyl tin dilaurate | 0.75 g |
| Ethyl acetate | 120 g | and 46.4 g of ethylene glycol acrylate was poured gradually over these components in 45 minutes.

The reaction was started at 25° C., and then the temperature rapidly reached 45° C., whereupon it was stabilized. Baking was then performed for 45 minutes at this temperature, and then the resulting ensemble was poured in 20 minutes over the methoxy-PEG as pre-heated to 650C. Once the pouring was finished, the resulting ensemble was allowed to react for one hour at 65° C.

Distillation under a vacuum was then performed in order to remove the residual solvent.

The resulting product was a pale yellow paste whose monomer content was 100%.

EXAMPLE 2

This example relates to fabricating a mortar with various agents and to determining the effectiveness of each of the polymers in Example 2, the polymers being tested as workability agents.

For this purpose, for all of the tests (Tests Nos. 10 to 47) the mortar was fabricated using the following procedure:

1,890 g of CEN EN 196-1 sand complying with the ISO 679 Standard was weighed out in the stainless steel bowl of a planetary mixer, and 630 g of CEM 1 52,5 R cement was sprinkled onto the sand as it was being agitated at 45 revolutions per minute (r.p.m.) and in 30 seconds. The agitation was then continued for 30 additional seconds.

The mixture, made up of 315 g of ordinary water (Water/Cement ratio =0.5) and of 0.16% by dry weight of workability agent to be tested relative to the dry cement, was then poured in 30 seconds under the same agitation.

The resulting mortar was then agitated for 2 minutes at 85 r.p.m.

For each of the tests, the workability of the mortar was measured.

For the purpose of performing such measurement, the test was started at the end of 2 minutes of agitation by filling the vibrator V (SINEX Type VS 130) with the mortar (1) made as described above(FIG. 1/1 (a)), and by measuring the flow time from the removal of the partition A, under vibration, at time T (see FIG. 1/1 (b)) until the notch mark placed in the vertical wall B (see FIG. 1/1 (b)) was reached.

This measurement was repeated every 15 minutes or more, until the flow time reached 30 seconds. The workability value obtained and referred to as the "workability at 30 seconds" corresponded to the time elapsed from the fabrication of the mortar to the moment when the flow time of the mortar in the vibrator reached 30 seconds. The faster the product flowed and the longer it retained this flow capability, the better the product, i.e. the higher the workability value, the better the product.

As is known, it is possible for foam to have a thinning action. Thus, for the tests, efforts were made not to produce foam in order not to distort the workability results.

In certain cases, antifoam was added to prevent the thinning effect of foam.

When no foam formed, no antifoam was used.

Test No. 10:

This test illustrates the prior art and implemented the workability agent sold by Mapei under the name Mapefluid X404.

Test No. 11:

This test illustrates the prior art and implemented the workability agent sold by MBT under the name Glenium 51.

Test No. 12:

This test illustrates the prior art and implemented a copolymer 100% neutralized with soda, of composition by weight of monomer equal to 24.1% of acrylamide, 24.1% of acrylic acid, 4.9% of methacrylic acid, and 46.9% of PEG 750-methoxy methacrylate.

Test No. 13:

This test illustrates the invention and implemented a copolymer 100% neutralized with soda, of specific viscosity equal to 0.37 and of composition by weight of monomer equal to 43.2% of acrylamide, 13.5% of ethylene glycol methacrylate phosphate, 9.7% of ethyl acrylate, and 33.6% of Test No. 3 monomer.

Test No. 14:

This test illustrates the invention and implemented a copolymer 100% neutralized with soda, of specific viscosity equal to 0.39 and of composition by weight of monomer equal to 34.6% of acrylamide, 13.5% of ethylene glycol methacrylate phosphate, 11.6% of ethyl acrylate, and 40.3% of Test No. 3 monomer.

Test No. 15:

This test illustrates the invention and implemented a copolymer 100% neutralized with soda, of specific viscosity equal to 0.36 and of composition by weight of monomer equal to 51.9% of acrylamide, 13.5% of ethylene glycol methacrylate phosphate, 7.7% of ethyl acrylate., and 26.9% of Test No. 3 monomer.

Test No. 16:

This test illustrates the invention and implemented a copolymer 100% neutralized with soda, of specific viscosity equal to 0.52 and of composition by weight of monomer equal to 34.6% of acrylamide, 13.5% of methacrylic acid, 11.6% of ethyl acrylate, and 40.3% of Test No. 3 monomer.

Test No. 17:

This test illustrates the invention and implemented a copolymer 100% neutralized with soda, of specific viscosity equal to 0.68 and of composition by weight of monomer equal to 24.1% of acrylamide, 24.0% of methacrylic acid, 11.6% of ethyl acrylate, and 40.3% of Test No. 3 monomer.

Test No. 18:

This test illustrates the invention and implemented a copolymer 100% neutralized with soda, of specific viscosity equal to 0.705 and of composition by weight of monomer equal to 12.0% of acrylamide, 36.1% of methacrylic acid, 11.6% of ethyl acrylate, and 40.3% of Test No. 3 monomer.

Test No. 19:

This test illustrates the invention and implemented a copolymer 100% neutralized with soda, of specific viscosity equal to 0.55 and of composition by weight of monomer equal to 24.1% of acrylamide, 24.0% of methacrylic acid, 11.6% of ethyl acrylate, and 40.3% of Test No. 3 monomer.

Test No. 20:

This test illustrates the invention and implemented a copolymer 100% neutralized with soda, of specific viscosity equal to 0.61 and of composition by weight of monomer equal to 24.1% of acrylamide, 24.0% of methacrylic acid, 11.6% of ethyl acrylate, and 40.3% of Test No. 3 monomer.

Test No. 21:

This test illustrates the invention and implemented a copolymer of the same monomer composition as the preceding one, and of the same molecular weight, but 100% neutralized with potash.

Test No. 22:

This test illustrates the invention and implemented a copolymer of the same monomer composition as the preceding one, and of the same molecular weight, but 100% neutralized with magnesium hydroxide.

Test No. 23:

This test illustrates the invention and implemented a copolymer of the same monomer composition as the preceding one, and of the same molecular weight, but 100% neutralized with ammonium hydroxide.

Test No. 24:

This test illustrates the invention and implemented at copolymer of the same monomer composition as the preceding one, and of the same molecular weight, but 100% neutralized with lime.

Test No. 25:

This test illustrates the invention and implemented a copolymer of the same monomer composition as the preceding one, and of the same molecular weight, but 100% neutralized with lithium hydroxide.

Test No. 26:

This test illustrates the invention and implemented a copolymer 100% neutralized with soda, of specific viscosity equal to 1.93 and of composition by weight of monomer equal to 18.6% of methacrylic acid, 62.6% of PEG 750-methoxy methacrylate, 4.2% of ethyl acrylate, and 14.6% of Test No. 3 monomer.

Test No. 27:

This test illustrates the invention and implemented a copolymer 100% neutralized with soda, of specific viscosity equal to 0.52 and of composition by weight of monomer equal to 24.1% of acrylamide, 24.0% of acrylic acid, 28.5% of Test No. 4 monomer, 6.1% of ethyl acrylate, and 17.3% of methoxy-2 moles of ethylene oxide acrylate also referred to as "diethylene glycol methoxy acrylate".

Test No. 28:

This test illustrates the invention and implemented a copolymer 100% neutralized with soda, of specific viscosity equal to 0.50 and of composition by weight of monomer equal to 24.1% of acrylamide, 24.0% of acrylic acid, 21.4% of Test No. 4 monomer, 4.6% of ethyl acrylate, and 25.9% of methoxy-2 moles of ethylene oxide acrylate.

Test No. 29:

This test illustrates the invention and implemented a copolymer 100% neutralized with soda, of specific viscosity equal to 0.53 and of composition by weight of monomer equal to 24.1% of acrylamide, 24.0% of acrylic acid, 36.4% of Test No. 4 monomer, 7.7% of ethyl acrylate, and 7.8% of methoxy-2 moles of ethylene oxide acrylate.

Test No. 30:

This test illustrates the invention and implemented a copolymer 100% neutralized with soda, of specific viscosity equal to 0.73 and of composition by weight of monomer equal to 48.1% of methacrylic acid, 40.3% of Test No. 3 monomer, and 11.6% of ethyl acrylate.

Test No. 31:

This test illustrates the invention and implemented, a copolymer 100% neutralized with soda, of specific viscosity equal to 0.59 and of composition by weight of monomer equal to 48.1% of methacrylic acid, 40.3% of Test No. 3 monomer, and 11.6% of ethyl acrylate.

Test No. 32:

This test illustrates the invention and implemented a copolymer 100% neutralized with soda, of specific viscosity equal to 0.40 and of composition by weight of monomer equal to 24.1% of acrylamide, 24.0% of acrylic acid, 40.3% of Test No. 3 monomer, and 11.6% of ethyl acrylate.

Test No. 33:

This test illustrates the invention and implemented a copolymer 100% neutralized with soda, of specific viscosity equal to 0.54 and of composition by weight of monomer equal to 24.1% of acrylamide, 24.0% of acrylic acid, 40.3% of Test No. 3 monomer, and 11.6% of ethyl acrylate.

Test No. 34:

This test illustrates the invention and implemented a copolymer 100% neutralized with soda, of specific viscosity equal to 0.59 and of composition by weight of monomer equal to 24.1% of acrylamide, 24.0% of acrylic acid, 40.3% of Test No. 3 monomer, and 11.6% of ethyl acrylate.

Test No. 35:

This test illustrates the invention and implemented a copolymer 100% neutralized with soda, of specific viscosity equal to 0.65 and of composition by weight of monomer equal to 24.1% of acrylamide, 24.0% of acrylic acid, and 51.9% of Test No. 5 monomer.

Test No. 36:

This test illustrates the invention and implemented a copolymer 100% neutralized with soda, of specific viscosity equal to 0.57 and of composition by weight of monomer equal to 24.1% of acrylamide, 24.0% of acrylic acid, 42.8% of Test No. 4 monomer, and 9.1% of ethyl acrylate.

Test No. 37:

This test illustrates the invention and implemented a copolymer 100% neutralized with soda, of specific viscosity equal to 0.96 and of composition by weight of monomer equal to 24.1% of acrylamide, 24.0% of acrylic acid, 49.0% of Test No. 6 monomer, and 2.9% of ethyl acrylate.

Test No. 38:

This test illustrates the invention and implemented a copolymer 100% neutralized with soda, of specific viscosity equal to 0.63 and of composition by weight of monomer equal to 24.1% of acrylamide, 12.1% of ethyl acrylate, 24.0% of methacrylic acid, and 39.8% of Test No. 8 monomer.

Test No. 39:

This test illustrates the invention and implemented a copolymer 100% neutralized with soda, of specific viscosity equal to 0.60 and of composition by weight of monomer equal to 24.1% of acrylamide, 12.1% of ethyl acrylate, 24.0% of methacrylic acid, and 39.8% of Test No. 7 monomer.

Test No. 40:

This test illustrates the invention and implemented a copolymer 100% neutralized with soda, of specific viscosity equal to 0.605 and of composition by weight of monomer equal to 24.1% of acrylamide, 11.6% of ethyl acrylate, 24.0% of methacrylic acid, and 40.3% of Test No. 9 monomer.

Test No. 41:

This test illustrates the invention and implemented a copolymer 100% neutralized with soda, of specific viscosity equal to 0.80 and of composition by weight of monomer equal to 13.5% of ethylene glycol methacrylate phosphate, 26.0% of ethyl acrylate, and 60.5% of Test No. 2 monomer.

Test No. 42:

This test illustrates the invention and implemented a copolymer 100% neutralized with soda, of specific viscosity equal to 0.70 and of composition by weight of monomer equal to 51.9% of acrylamide, 13.5% of ethylene glycol methacrylate phosphate, 6.7% of ethyl acrylate, 26.9% of Test No. 3 monomer, and 1% of EDMA crosslinking agent.

Test No. 43:

This test illustrates the invention and implemented a copolymer 100% neutralized with soda, of specific viscosity equal to 1.6 and of composition by weight of monomer equal to 15.0% of methacrylic acid, 70.0% of PEG 750-methoxy methacrylate, 3.3% of ethyl acrylate, and 11.7% of Test No. 3 monomer.

Test No. 44:

This test illustrates the invention and implemented a copolymer 100% neutralized with soda, of specific viscosity equal to 1.5 and of composition by weight of monomer equal to 15.0% of methacrylic acid, 75.0% of PEG 750-methoxy methacrylate, 2.2% of ethyl acrylate, and 7.8% of Test No. 3 monomer.

Test No. 45:

This test illustrates the invention and implemented a copolymer 100% neutralized with soda, of specific viscosity equal to 1.74 and of composition by weight of monomer equal to 40% of methacrylic acid, 40.0% of PEG 750-methoxy methacrylate, 4.4% of ethyl acrylate and 15.6% of Test No. 3 monomer.

Test No. 46:

This test illustrates the invention and implemented a copolymer 100% neutralized with soda, of specific viscosity equal to 1.14 and of composition by weight of monomer equal to 12% of methacrylic acid, 80.0% of PEG 750-methoxy methacrylate, 2.0% of ethyl acrylate and 6.0% of Test No. 3 monomer.

Test No. 47

This test illustrates the invention and implemented a copolymer 100% neutralized with soda, of specific viscosity equal to 0.41 and of composition by weight of monomer equal to 13.0% of methacrylic acid, 61.7% of PEG 750-methoxy methacrylate, 5.0% of ethyl acrylate and 20.3% of Test No. 1 monomer.

The results of the workability values at 30 seconds of the various tests obtained by implementing the above-described procedure are given in the following tables, namely Tables I, Ia, and Ib:

TABLE I

| | Test No. | Workability at 30 seconds in minutes |
|---|---|---|
| Prior art | 10 | 182 |
| Prior art | 11 | 200 |
| Prior art | 12 | 177 |
| Invention | 13 | 258 |
| Invention | 14 | 238 |
| Invention | 15 | 225 |
| Invention | 16 | 233 |
| Invention | 17 | 241 |
| Invention | 18 | 207 |
| Invention | 19 | 228 |
| Invention | 20 | 240 |
| Invention | 21 | 202 |
| Invention | 22 | 220 |
| Invention | 23 | 200 |
| Invention | 24 | 210 |
| Invention | 25 | 215 |

TABLE Ia

| | Test No. | Workability at 30 seconds in minutes |
|---|---|---|
| Invention | 26 | 208 |
| Invention | 27 | 200 |
| Invention | 28 | 226 |
| Invention | 29 | 250 |
| Invention | 30 | 200 |
| Invention | 31 | 215 |
| Invention | 32 | 215 |
| Invention | 33 | 231 |
| Invention | 34 | 215 |
| Invention | 35 | 210 |
| Invention | 36 | 215 |
| Invention | 37 | 200 |
| Invention | 38 | 269 |
| Invention | 39 | 210 |
| Invention | 40 | 210 |
| Invention | 41 | 200 |
| Invention | 42 | 225 |

TABLE Ib

| | Test No. | Workability at 30 seconds in minutes |
|---|---|---|
| Invention | 43 | 230 |
| Invention | 44 | 225 |
| Invention | 45 | 210 |
| Invention | 46 | 230 |
| Invention | 47 | 220 |

The results obtained in Tests Nos. 13 to 47 of the invention show a significant increase in workability properties, and in particular that a characteristic imparted by the invention is a workability measurement that is greater than or equal to 200 minutes.

EXAMPLE 3

This example illustrates variation in the quantity of workability agent.

Test No. 48:

This test illustrates the invention and implemented the workability agent of Test No. 13 in a proportion of 0.1% by dry weight of workability agent relative to the dry weight of cement.

The workability value measured using the same procedure as that described in the preceding tests was equal to 200 minutes.

Test No. 49:

This test illustrates the invention and implemented the workability agent of Test No. 13 in a proportion of 0.25% by dry weight of workability agent relative to the dry weight of cement.

The workability value measured using the same procedure as that described in the preceding tests was equal to 250 minutes.

These two tests make it possible to observe that the workability of the invention may be implemented in quantities ranging from 0.1% to 0.3% by dry weight relative to the dry weight of cement.

EXAMPLE 4

This example relates to fabricating a mortar in the field of petroleum cements and to determinating the effectiveness of one polymer in Example 2, the polymer being tested as workability agent.

For this purpose, for the two tests (Tests Nos. 50 and 51) the mortar was manufactured using the following procedure:

1,890 g of CEN EN 196-1 sand complying with the ISO 679 Standard was weighed out in the stainless steel bowl of a planetary mixer, and 630 g of CEM 1 52,5 R cement was sprinkled onto the sand as it was being agitated at 45 revolutions per minute (r.p.m.) and in 30 seconds. The agitation was then continued for 30 additional seconds.

The mixture, made up of 315 g of sea water (Water/Cement ratio=0.5) and of 0.16% by dry weight of workability agent to be tested relative to the dry cement, was then poured in 30 seconds under the same agitation.

The used sea water is characterized by a composition by weight for 1 liter of sea water equal to:

NaCl=44,05 g

KCl=0,67 g $MgCl_2$, $6H_2O$=4,66 g $MgSO_4$, $7H_2O$=6,29 g $CaCl_2$, $2H_2O$=1,36 g $NaHCO_3$ =0,18 g $H_{2O}$ bipermuted=q.s.p. 1 liter The resulting mortar was then agitated for 2 minutes at 85 r.p.m.

The workability measurement is performed on the resulting mortar and for each of the tests.

For this measurement, the test is implemented using the same operating procedure and with the same equipment as those mentioned in Example 2.

Test No. 50

This test illustrates the prior art and implementes a lignosulfonate sold by AVBN. The workability value obtained at 30 seconds is equal to 85 minutes.

Test No. 51

This test illustrates the invention and implementes the same polymer as in the test No. 20. The workability value obtained at 30 seconds is equal to 210 minutes.

The result obtained in the test No. 51 as the invention indicates the significant increase of the workability properties in the fied of the petroleum cements.

What is claimed is:

1. A novel workability agent for a hydraulic binder comprising a copolymer, said copolymer obtained by radical copolymerization of at least one alkoxy-polyalkylene glycol urethane ethylene monomer with at least one anionic monomer and at least one non-ionic monomer optionally in the presence of alkoxy-PEG acrylate or methacrylate and of one or more ethylene monomers having at least two polymerizable double bonds, wherein the at least one alkoxy-polyalkylene glycol urethane ethylene monomer is the reaction product of methoxy-polyethylene glycol with a polymerizable unsaturated isocyanate.

2. The novel workability agent for a hydraulic binder according to claim 1, comprising:
   a) in the range 1% by weight to 50% by weight of one or more anionic monomers;
   b) in the range 2% to 65% by weight of one or more nonionic monomers;
   c) in the range 3% to 65% by weight of an alkoxypolyalkylene glycol urethane ethylene monomer;
   d) in the range 0% to 90% by weight of an alkoxy-PEG acrylate or methacrylate; and
   e) in the range 0% to 5% by weight of a crosslinking agent;
      wherein the sum of the quantities of the monomers a), b), c), d) and e) is 100%.

3. The novel workability agent for a hydraulic binder according to claim 2, comprising:

a) in the range 5% to 40% by weight of one or more anionic monomers;
b) in the range 5% to 60% by weight of one or more nonionic monomers;
c) in the range 10% to 50% by weight of an alkoxypolyalkylene glycol urethane ethylene monomer;
d) in the range 0% to 70% by weight of an alkoxy-PEG acrylate or methacrylate; and
e) in the range 0% to 3% by weight of a crosslinking agent;
   wherein the sum of the quantities of the monomers a), b), c), d) and e) is 100%.

4. The novel workability agent for a hydraulic binder according claim 1, wherein the at least one anionic monomer is selected from the group consisting of acrylic acid, methacrylic acid, acrylamido-methyl-propane-sulfonic acid, alkylene glycol acrylate, alkylene glycol methacrylate sulfonate, alkylene glycol sulfate, alkylene glycol phosphonate, alkylene glycol phosphate, itaconic acid, maleic anhydride, sodium methallylsulfonate, and sulfonic styrene acid.

5. The novel workability agent for a hydraulic binder according to claim 1, wherein the at least one anionic monomer is selected from the group consisting of acrylic acid, methacrylic acid, acrylamido-methyl-propane sulfonic acid, ethylene glycol methacrylate phosphate and ethylene glycol acrylate phosphate.

6. The novel workability agent for a hydraulic binder according to claim 1, wherein the at least one non-ionic monomer is selected from the group consisting of acrylamide, methacrylamide, derivatives of methacrylamide, derivatives of acrylamide, $C_1$ to $C_5$ alkylesters of acrylic acid, $C_1$ to $C_5$ alkyl esters of methacrylic acid, oxyalkylated alkoxy acrylates having 1 to 5 alkylene oxides, oxyalkylated alkoxy methacrylates having from 1 to 5 alkylene oxides, vinyl acetate, vinylpyrrolidone, styrene, and alphamethyl-styrene.

7. The novel workability agent for a hydraulic binder according to claim 1, wherein the at least one non-ionic monomer is selected from the group consisting of ethyl acrylate and acrylamide.

8. The novel workability agent for hydraulic binders according to claim 1, wherein the at least one alkoxy-polyalkylene glycol urethane monomer is the reaction product of alkoxy-polyalkylene glycol with a polymerizable unsaturated isocyanate.

9. The novel workability agent for hydraulic binders according to claim 8, wherein the polymerizable unsaturated isocyanate is selected from the group consisting of an acrylic isocyanate, a methacrylic isocyanate, a vinyl isocyanate, and an allyl isocyanate.

10. The novel workability agent for hydraulic binders according to claim 1, wherein the polymerizable unsaturated isocyanate is selected from the group consisting of an acrylic isocyanate, a methacrylic isocyanate, a vinyl isocyanate, and an allyl isocyanate.

11. The novel workability agent for hydraulic binders according to claim 9, wherein the polymerizable unsaturated isocyanate is selected from the group consisting of dimethyl isopropenyl benzyl isocyanate, methacryloyl isocyanate and allylisocyanate.

12. The novel workability agent for hydraulic binders according to claim 10, wherein the polymerizable unsaturated isocyanate is selected from the group consisting of dimethyl isopropenyl benzyl isocyanate, methacryloyl isocyanate and allylisocyanate.

13. The novel workability agent for hydraulic binders according to claim 9, wherein the polymerizable unsaturated isocyanate is the reaction product of a polymerizable unsaturated alcohol with a diisocyanate.

14. The novel workability agent for hydraulic binders according to claim 10, wherein the polymerizable unsaturated isocyanate is the reaction product of a polymerizable unsaturated alcohol with a diisocyanate.

15. The novel workability agent for hydraulic binders according to claim 13, wherein the diisocyanate is selected from the group consisting of toluene diisocyanate and isophorone diisocyanate.

16. The novel workability agent for hydraulic binders according to claim 14, wherein the diisocyanate is selected from the group consisting of toluene diisocyanate and isophorone diisocyanate.

17. The novel workability agent for hydraulic binders according to claim 13, wherein the polymerizable unsaturated alcohol is selected from the group consisting of ethylene glycol acrylate, ethylene glycol methacrylate and allyl alcohol.

18. The novel workability agent for hydraulic binders according to claim 14, wherein the polymerizable unsaturated alcohol is selected from the group consisting ethylene glycol acrylate, ethylene glycol methacrylate and allyl alcohol.

19. The novel workability agent for hydraulic binders according to claim 8, wherein the at least one alkoxy-polyalkylene glycol urethane monomer is an alkoxy-polyethylene glycol urethane monomer.

20. The novel workability agent for hydraulic binders according to claim 8, wherein the at least one alkoxy-polyalkylene glycol urethane monomer is a methoxy-polyethylene glycol urethane monomer.

21. The novel workability agent for hydraulic binders according to claim 20, wherein the methoxy-polyethylene glycol has a molecular weight from 350 to 5,000.

22. The novel workability agent for hydraulic binders according to claim 21, wherein the methoxy-polyethylene glycol has a molecular weight from 500 to 1,500.

23. The novel workability agent for hydraulic binders according to claim 1, wherein the one or more ethylene monomers having at least two polymerizable double bonds is selected from the group consisting of methylene-bis-acrylamide (MBA), methylene-bismethacrylamide, allyl acrylate, tetrallyloxyethane, a triallylcyanurate (TAC), an allyl ether obtained from a polyol or from triallylated pentaerythritol, a pentaerythritol triacrylate, ethylene glycol dimethacrylate (EDMA), trimethylolpropane triacrylate, a di-vinylbenze and a tri-vinylbenzene.

24. The novel workability agent for hydraulic binders according to claim 23, wherein the polyol is sorbitol or sucrose.

25. The novel workability agent for hydraulic binders according to claim 1, wherein said agent has a specific viscosity of less than 2.

26. The novel workability agent for hydraulic binders according to claim 1, wherein said agent has a specific viscosity of from 0.3 to 1.6.

27. A method for improving the workability of a hydraulic binder comprising incorporating the novel workability agent for hydraulic binders according to claim 1, in said hydraulic binder.

28. A hydraulic binder comprising a workability agent according to claim 1.

29. The hydraulic binder according to claim 28, wherein said binder is selected from the group consisting of concrete, mortar, a mixture of cement, a mixture of plaster and combinations thereof.

30. A hydraulic binder comprising from 0.1% to 0.3% of dry weight of a workability agent according to claim 1, relative to the dry weight of a cement, a plaster or a combination thereof.

31. The hydraulic binder according to claim 30, wherein said binder is selected from the group consisting of concrete, mortar, a mixture of cement and a mixture of plaster.

32. A method of constructing a building, public work, or petroleum service facility comprising pouring the hydraulic binder according to claim 28, into a form and allowing said hydraulic binder to harden.

33. A method of constructing a building, public work, or petroleum service facility comprising pouring the hydraulic binder according to claim 30, into a form and allowing said hydraulic binder to harden.

\* \* \* \* \*

UNITED STATES PATENT AND TRADEMARK OFFICE
CERTIFICATE OF CORRECTION

PATENT NO.   : 6,660,799 B1
DATED        : December 9, 2003
INVENTOR(S)  : Yves Kensicher et al.

It is certified that error appears in the above-identified patent and that said Letters Patent is hereby corrected as shown below:

Column 6,
Line 3, "C)" should read -- c) --.

Column 9,
Line 1, "250C.," should read -- 25°C., --.

Column 17,
Line 20, H$_{2O}$" should read -- H$_2$O --.
Line 39, "fied" should read -- field --.

Signed and Sealed this

Twenty-second Day of June, 2004

JON W. DUDAS
*Acting Director of the United States Patent and Trademark Office*